(12) United States Patent
Wilson

(10) Patent No.: US 6,796,706 B2
(45) Date of Patent: Sep. 28, 2004

(54) FOOD MIXER

(75) Inventor: Ian Wilson, Cheltenham (AU)

(73) Assignee: Sunbeam Corporation Limited, Campsie (AU)

( * ) Notice: Subject to any disclaimer, the term of this patent is extended or adjusted under 35 U.S.C. 154(b) by 0 days.

(21) Appl. No.: 10/176,412

(22) Filed: Jun. 11, 2002

(65) Prior Publication Data

US 2003/0041742 A1 Mar. 6, 2003

(51) Int. Cl.7 .................................................. B01F 7/16
(52) U.S. Cl. ........................ 366/200; 366/206; 366/605
(58) Field of Search ................................. 366/200, 201, 366/206, 197, 605

(56) References Cited

U.S. PATENT DOCUMENTS

| 4,089,367 A | 5/1978 | Wietzel et al. ............... 165/101 |
| 4,403,867 A * | 9/1983 | Duke ........................... 366/601 |
| 4,854,715 A * | 8/1989 | Eirich et al. .................. 366/139 |
| 4,919,539 A * | 4/1990 | Drocco ......................... 366/224 |
| 6,588,930 B2 * | 7/2003 | Wilson ......................... 366/200 |

FOREIGN PATENT DOCUMENTS

JP            4193127 A      7/1992

* cited by examiner

Primary Examiner—Tony G. Soohoo
(74) Attorney, Agent, or Firm—William Michael Hynes; Townsend and Townsend and Crew LLP

(57) ABSTRACT

A food mixer 10 having a turntable 22 that receives a bowl 23. Projecting into a bowl 23 are beaters 24 that are driven by means of a motor 13. The turntable 22 is driven by means of a motor 25. A common speed control member in the form of a dial 29 operates a pair of potentiometers 31 that control the motors 13 and 25 so that there is a correlation between the speeds thereof.

10 Claims, 5 Drawing Sheets

FOOD MIXER

TECHNICAL FIELD

The present invention relates to food mixers.

BACKGROUND OF THE INVENTION

The invention relates to mixers typically used for mixing cake ingredients. Such mixers conventionally have a pair of counter-rotating beaters which extend downwardly from a mixing head into a mixing bowl. The beaters are offset from the vertical center axis of the bowl such that, upon rotation of the bowl, all of the cake ingredients are blended by the beaters.

Such food mixers include a base having a turntable or carousel upon which the mixing bowl sits. From the base there extends a post upon which there is pivotally mounted a mixing head from which the beaters depend. A powerful electric motor situated within the head is connected by transmission means to the beaters. In some machines, torque output from this motor is also transferred via a mechanical transmission to the base so as to effect rotation of the turntable or carousel. In less expensive machines, the turntable rotates as a result of the interaction of the beaters with the ingredients in the bowl. There is a significant loss of the motor's torque in the mechanical transmission from the motor to the base and turntable. For this reason, it is necessary to use an expensive motor having a torque output not only sufficient to drive the beaters through the cake ingredients but also to overcome mechanical losses in transmission to the turntable.

Also known are hand-held mixers having a pair of counter-rotating beaters depending therefrom. Such devices can be used conveniently by holding the device over a mixing bowl, saucepan or other vessel and maneuvering the device such that the motor-driven beaters are moved manually about the vessel for thorough mixing. Such a hand-held device can also be used in conjunction with a base having a rotatable turntable upon which a bowl sits. Such devices have an auxiliary output shaft from the motor for coupling to a transmission mechanism in the base to effect rotation of the turntable. These mixers suffer from the same problems as those fixed-head mixers discussed above.

SUMMARY OF THE INVENTION

It is an object of the present invention to overcome or substantially ameliorate at least one of the above disadvantages.

DISCLOSURE OF THE INVENTION

There is disclosed herein a food mixer having a base, a rotatable member mounted on the base and adapted to receive and support a bowl to be rotated by the member, a first motor drivingly connected to the rotatable member and located within the base and operable to drive the member, a head fixed to the base, at least one beater connector supported by the head and configured to receive and rotate a beater to extend into the bowl, and a second motor drivingly connected to the connector and located within the head to cause rotation of each connector.

Preferably the head is affixed to the base so as to pivot about a horizontal axis.

Preferably the mixer includes a control circuit electrically connected to the first and second motors to ensure a correlation between an operating rotational speed of each motor.

Preferably the control circuit includes two speed controls, one for adjusting an operational rotational speed of the connector, and the other for changing a correlation between the operation rotational speed of the connector and an operational rotational speed of the rotatable member.

In an alternative preferred form the food mixer further includes a user manipulated member that is moved by the user to control the speed of the first and second motors so that there is a correlation between the speed of a first motor and the speed of a second motor.

Preferably the food mixer includes a pair of variable resistance potentiometers operated by the user manipulated member, each potentiometer being associated with a respective one of the motors so as to govern the speed thereof.

Preferably, the user manipulated member is a dial that is moved angularly to cause operation of the potentiometers.

There is further disclosed herein a food mixer having a base, a rotatable member mounted on the base and adapted to receive and support a bowl to be rotated by the member, a first motor drivingly connected to the rotatable member and located within the base and operable to drive the member, a head mounted on the base, at least one beater connector supported by the head and configured to receive and rotate a beater to extend into the bowl, a second motor drivingly connected to the connector and located within the head to cause rotation of each connector, a user manipulated member that is moved by a user to govern the speed of the first and second motors to ensure there is a correlation between the speed of the first motor and the speed of the second motor, and an electric circuit operated by the user manipulated member to deliver electric power to the first motor and the second motor.

Preferably the electric circuit includes a pair of variable resistance potentiometers operated by the user manipulated member, each potentiometer being associated with a respective one of the electric motors to control the speed thereof.

Preferably the user manipulated member is a dial that is moved angularly to cause movement of the potentiometers.

Mounted to the head 12 is an electric control circuit 19 including a beater speed control dial 17 and a bowl speed control dial 18. Both dials 17 and 18 are moved angularly about the axis 33 to control the speed of the motors 13 and 25.

BRIEF DESCRIPTION OF THE DRAWINGS

Preferred forms of the present invention will now be described by way of example with reference to the accompanying drawings wherein.

DESCRIPTION OF THE PREFERRED EMBODIMENTS

Figure 1:
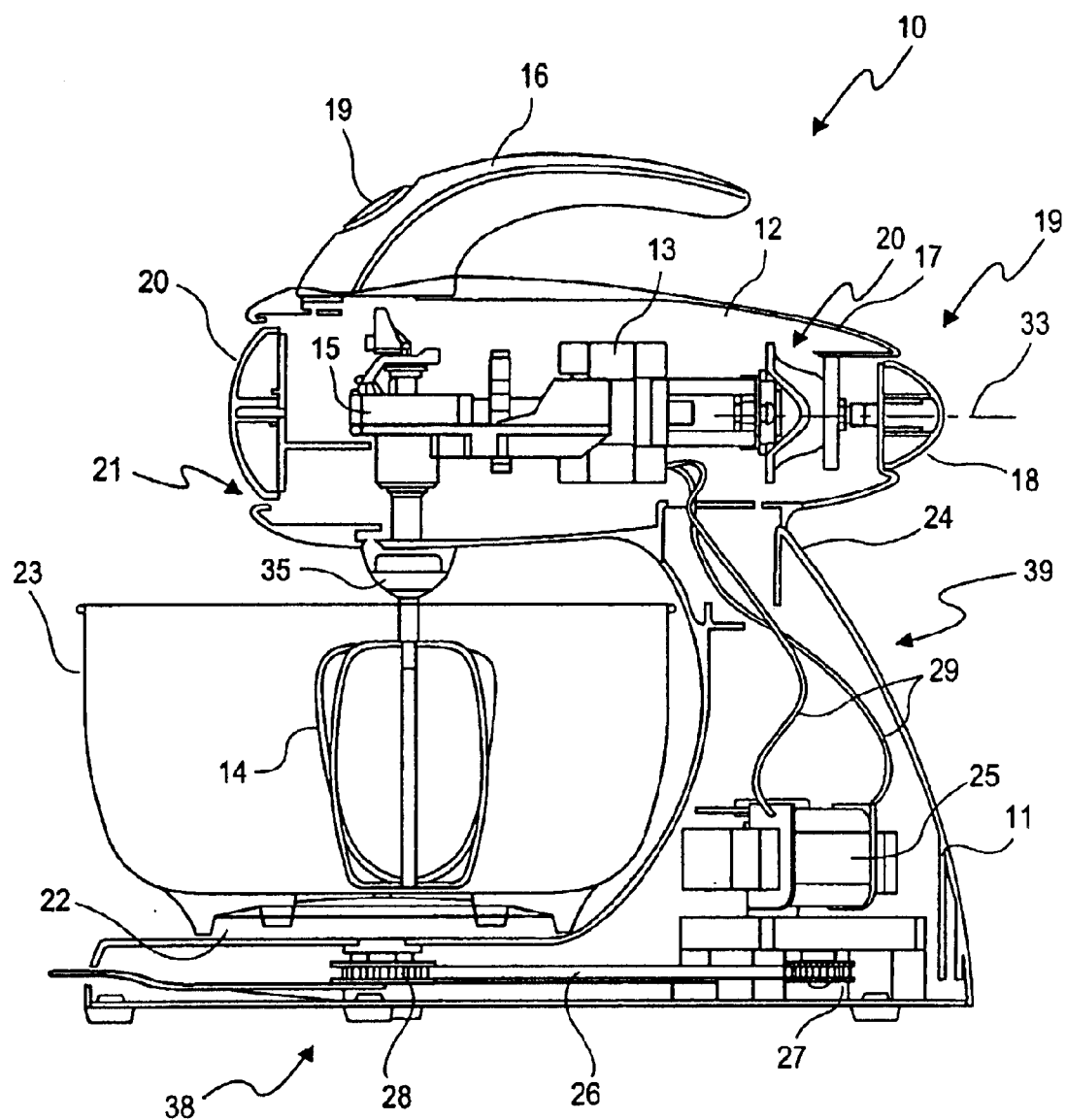
FIG. 1 is a schematic cross-sectional elevational view of a first food mixer.

In FIG. 1 of the accompanying drawings there is schematically depicted a food mixer 10 having a base 11 to sit upon a bench top and a head 12 attached hingedly at 24 to base 11 but not removable therefrom in general use. The base 11 has a lower portion 38 that rests on a kitchen bench, and an upwardly extending item 39 that engages the head 12.

Within the head 12 there is situated a beater motor 13 which drives a pair of beaters 14 via a beater transmission mechanism 15 and beater connectors 35. The motor 13 is cooled by air passing through air vents 21 adjacent to a fascia panel 20.

Extending upwardly from the head 12 is a handle 16 having a beater eject button 19 which ejects the beaters 14 from the beater connectors 35 by mechanical means (not shown).

Mounted to the head 12 is an electric control circuit 19 including a beater speed control dial 17 and a bowl speed control dial 18. Both dials 17 and 18 are moved angularly about the axis 37 to control the speed of the motors 13 and 25.

Within the base 11 there is situated a turntable motor 25 which turns a motor sprocket 27. The base 11 supports a rotatable member in the form of a turntable 22 upon which a bowl 23 can sit to receive the beaters 14. The turntable 22 has attached to it a turntable sprocket 28. A toothed belt 26 passes around sprockets 27 and 28 to transmit torque from motor 25 to turntable 22. The beaters 14 are offset from a vertical center line (rotational axis) of the turntable 22 such that rotation of the turntable 22 and bowl 23 effects thorough mixing of any ingredients in the bowl 23.

Included in the circuit 19 and associated with the speed control dials 17 and 18 are variable resistance devices 20 for individually controlling the supply of electric power to the respective motors 13 and 25. A pair of electrical conductors 29 extend between the motors. Control circuitry 19 electronically ensures that there is a correlation between the speed at which motor 25 operates and the speed at which motor 13 operates. Moreover, the bowl speed control dial 18 can be set to one of a number of preselected settings. However, the bowl 23 will only rotate upon movement of beater speed control dial 17 to one of a number of speed setting positions. The beater speed control dial 17 might gradually increase or decrease the speed of motor 13 and therefore beaters 14. Alternatively, the beater speed control 17 might simply select one of a number of operable speeds ranging from, say, zero to twenty. Depending on the setting of bowl speed control 18, the bowl might rotate slowly, quickly or at an intermediate setting, with bowl speeds within either setting being dependent upon the position of beater speed control dial 17. For example, with the bowl speed control dial 18 set to "SLOW" and the beater speed control dial 17 set to its minimum operational speed, then the bowl will rotate very slowly. The speed of the bowl can be increased without increasing the speed of the beaters by moving the bowl speed control dial 18 to either the intermediate or fast setting. The food mixer can therefore be operated with great flexibility ranging from very high beater speed with very low bowl speed to very low beater speed and very high bowl speed, and various combinations in between. Within any setting of the bowl speed control 18 (except "OFF"), the rotational speed of bowl 23 will vary proportionally with any increase or decrease in the speed of the beaters 14 set by beater speed control dial 17. In other words, the bowl speed control dial 18 effects the relative speed of the bowl 23 with respect to the speed of the beaters 14.

Each dial 17 and 18 moves a respective one of the devices 20.

Once mixing is completed, the handle 16 can be used to pivot the head 12 so as to raise the beaters 14 out of the bowl 23. The beaters 14 can then be ejected by activation of beater eject button 19.

The base 11 and head 12 might typically be diecast metal or plastic moldings.

Figure 2:
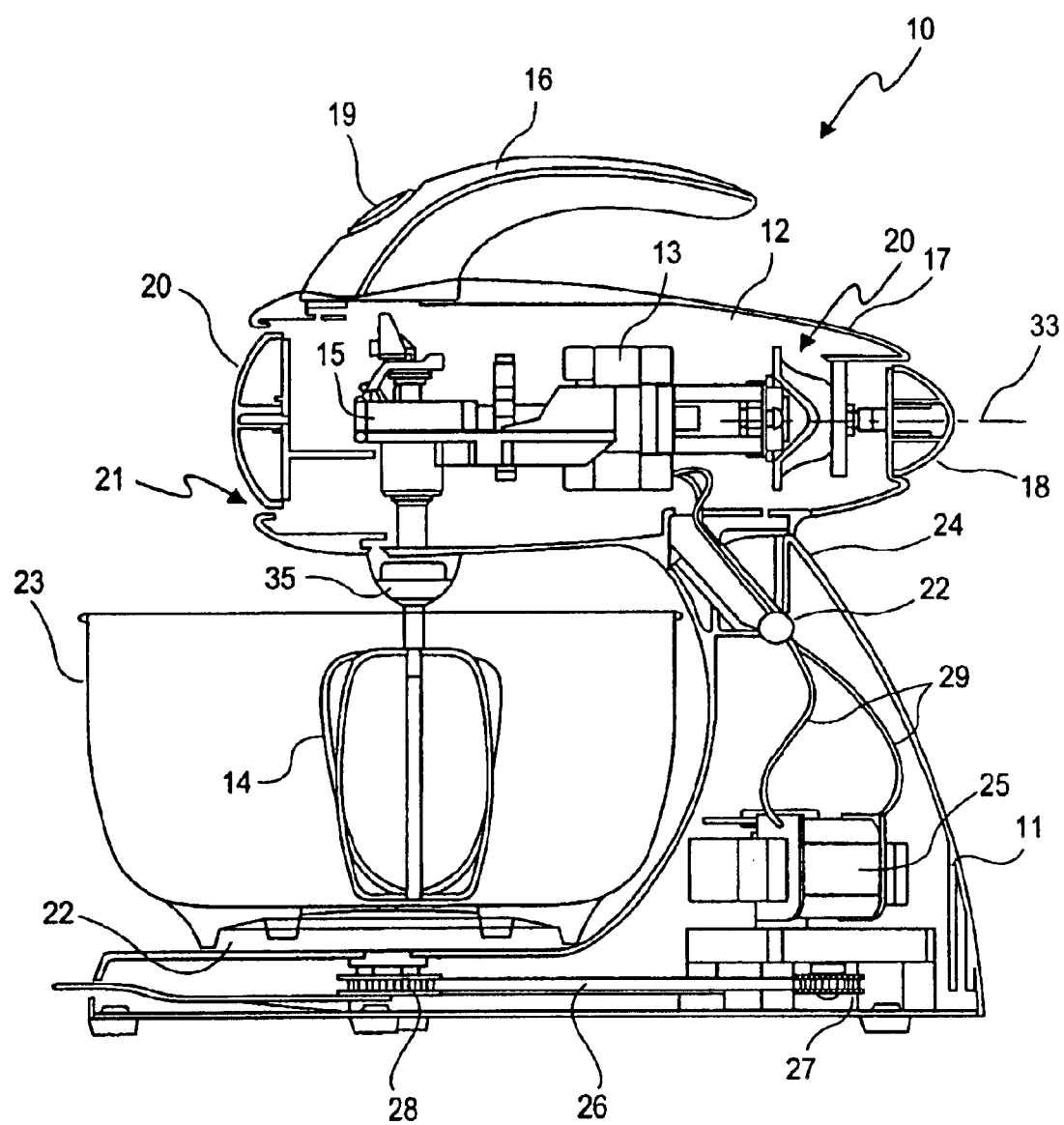
FIG. 2 is a schematic cross-sectional elevational view of a second food mixer.
Figure 3:
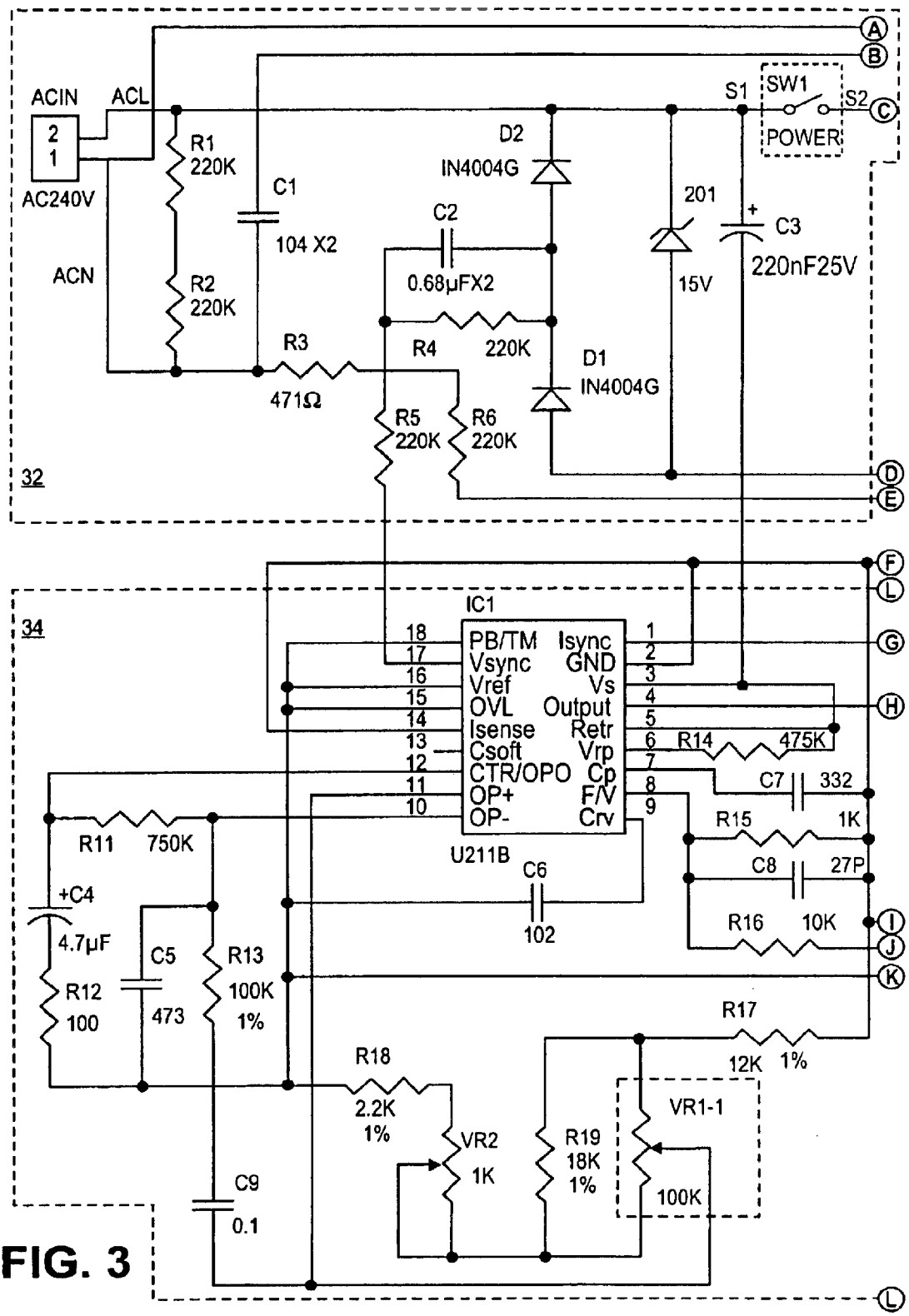
FIG. 3 is a schematic electrical circuit used in the food mixer of FIG. 2.
Figure 3:
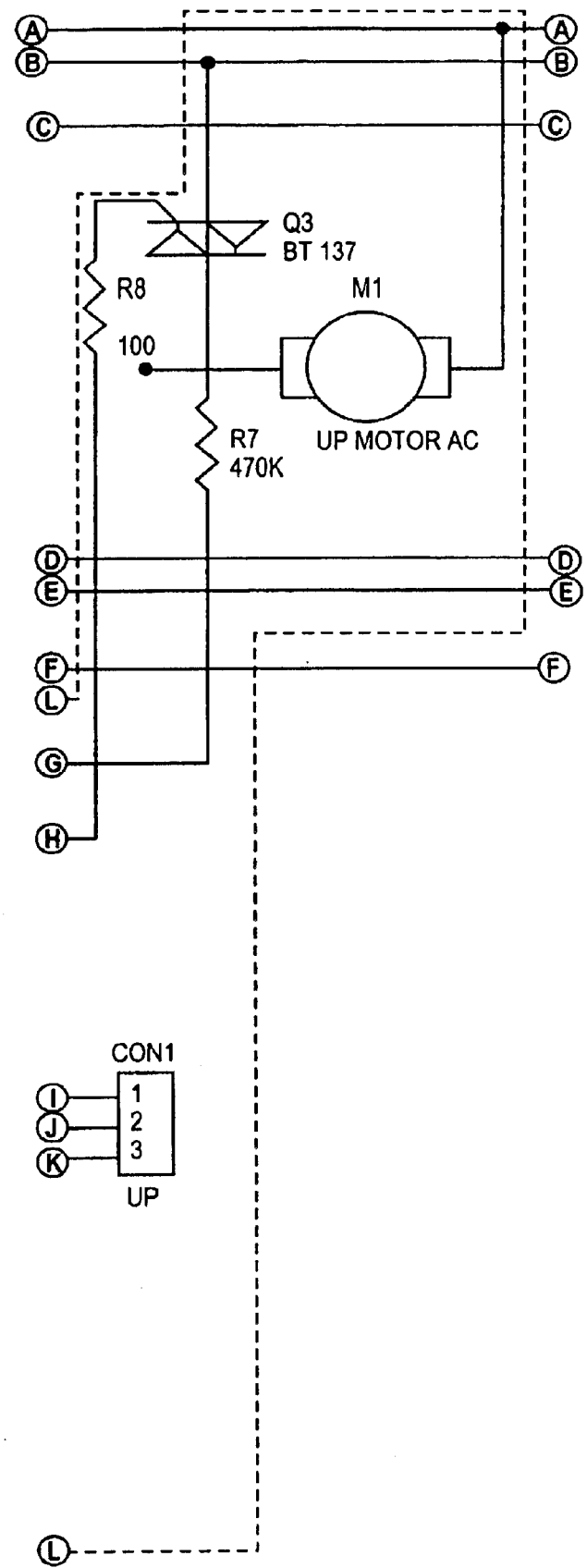
Figure 3:
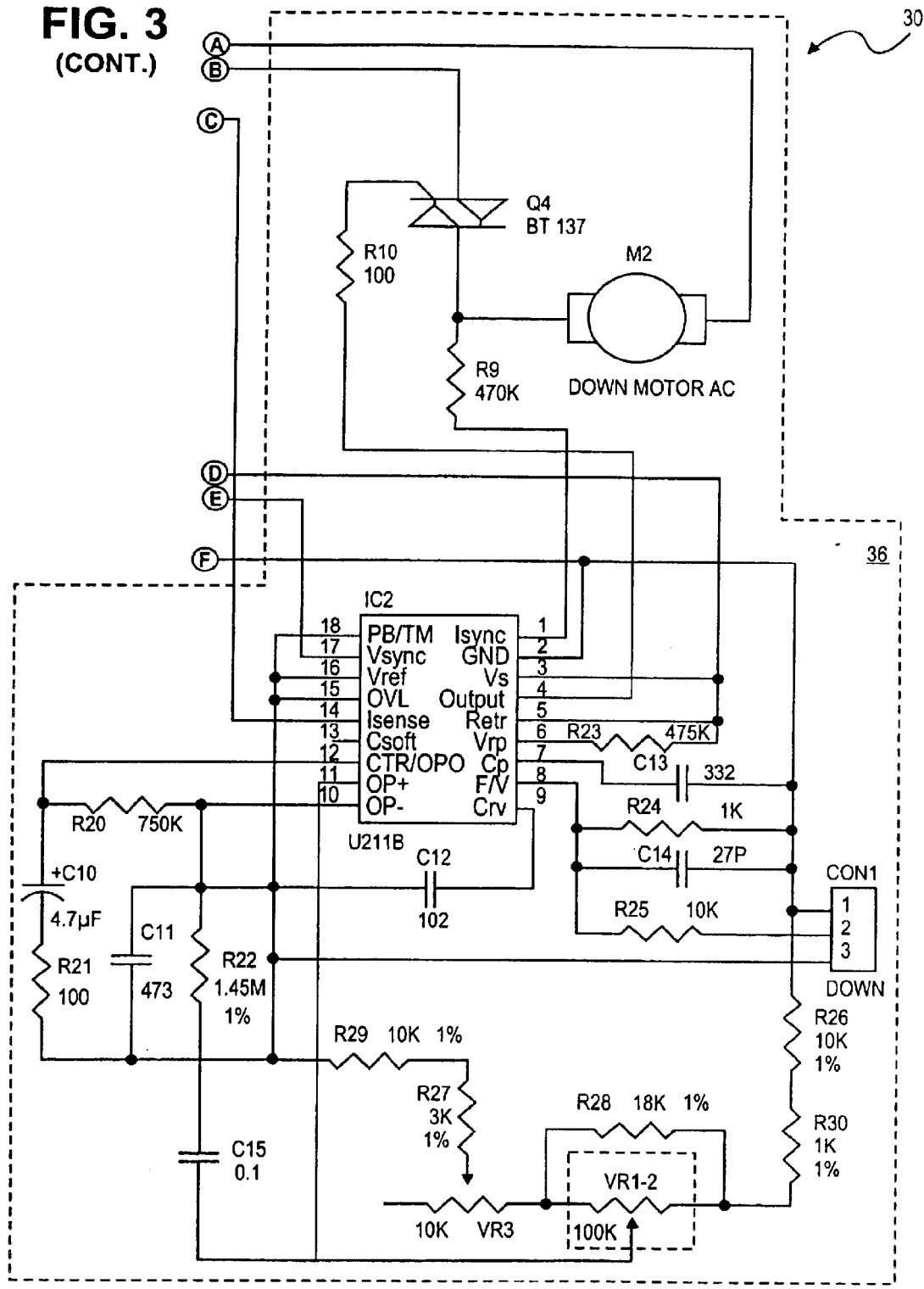

In FIGS. 2 and 3 of the accompanying drawings there is schematically depicted a modification of the food mixer 10 of FIG. 1. In this embodiment the same reference numerals have been applied.

In the embodiment of FIGS. 2 and 3 there is provided a user manipulated member in the form of a speed control dial 40. The dial 40 operates a pair of variable resistance (adjustable) potentiometers 31 that control the speed of the motors 13 and 25. Accordingly, the speed of the motors 13 and 25 is governed by the angular displacement of the dial 40 about axis 37. The potentiometers 31 are on a common shaft to ensure that there is a correlation between the speed of the motor 25 and the speed of the motor 13; that is, the potentiometers 31 are moved in unison.

Accordingly, in the above embodiment the dial 40 simultaneously operates two electric components of an electric circuit 30 to control the speed of the motors 13 and 25.

In the embodiment of FIG. 2 the head 12 is pivotally attached to the base 11 by means of a pivot assembly 22. The pivot assembly 22 provides a horizontal axis about which the head 12 pivots. This horizontal axis is generally normal to the rotational axis of the turntable 22 and the rotational axis of the connectors 35.

In the above-described preferred embodiments the turntable 22 is driven by means of sprockets 27 and 28 and belt 26. An alternative drive system would include a shaft and pinion gear that would mesh with a gear attached to the turntable 22 and a gear driven by the motor 25.

FIG. 3 is a schematic diagram of the electronic circuit 30 for controlling the speed of alternating current (AC) motors M1 and M2. The electronic circuit 30 comprises a power supply circuit 32 and two motor drive circuits 34 and 36, as shown in broken outline.

Referring to the power supply circuit 32, resistors R1, R2 and capacitor C1 comprise a mains input filter for filtering the AC mains signal supplied to the motors M1 and M2 via triacs Q3 and Q4, respectively.

D1 and D2 comprise a half-wave rectifier for conversion of AC to direct current (DC). Prior to rectification, however, the mains input voltage is reduced by capacitor C2 and resistor R4. The output voltage of the half-wave rectifier is regulated by zener diode ZD1 to 15V, and smoothed by capacitor C3. The resulting DC voltage is selectively applied to the drive circuits 34 and 36 by means of power switch SW1.

The following description is limited to drive circuit 34. However, drive circuit 36 operates in an identical manner and the following description is thus equally applicable to drive circuit 36, save for the different component references and values.

Drive circuit 34 comprises integrated circuit IC1, which generates trigger pulses to drive triac Q3, and a number of associated components. Triac Q3 is connected in series with the motor M1 across the AC mains supply. The drive pulses are routed from pin 4 of IC1 via resistor R8 to the gate of triac Q3. A current synchronization signal is provided via R7 to pin 1 of IC1.

Potentiometers VR1-1 and VR2 control the voltage of the input signal supplied to pin 11 of IC1, which is in turn used to adjust the phase angle of the triggering pulses produced at pin 4 of IC1. Potentiometer VR1-1 is adjustable by a user, whereas potentiometer VR2 is factory presettable. Capacitor C9 filters high frequency signals resulting from adjustment of potentiometer VR1-1.

Resistors R11, R12 and capacitors C4, C5 provide negative feedback to stabilize an input amplifier internal to IC1.

What is claimed is:

1. A food mixer having:
   a base;
   a rotatable member mounted on the base and adapted to receive and support a bowl to be rotated by the member;
   a first motor drivingly connected to said rotatable member and located within the base and operable to drive the member upon the first motor having a rotational speed;
   a head fixed to the base;
   at least one beater connector supported by said head and configured to receive and rotate a beater to extend into the bowl;
   a second motor drivingly connected to the connector and located within said head to cause rotation of each connector upon the second motor having a rotational speed; and
   a control circuit electrically connected to the first and second motors to ensure a correlation between the rotational speeds of the motors, with said control circuit being operable to adjust the speeds of the motors to desired speeds between zero and a maximum for each motor.

2. The food mixer of claim 1 wherein said head is affixed to said base so as to pivot about a horizontal axis.

3. The food mixer of claim 1 wherein the control circuit includes two speed controls, one for adjusting an operational rotational speed of the connector and the other for changing a correlation between the operation rotational speed of the connector and an operational rotational speed of said rotatable member.

4. The food mixer of claim 1 further including a user manipulated member operably associated with said circuit and moved by the user to control the speed of the first and second motors so that there is a correlation between the speed of a first motor and the speed of a second motor.

5. The food mixer of claim 4 further including a pair of variable resistance potentiometers operated by said user manipulated member, each potentiometer being associated with a respective one of said motors so as to govern the speed thereof.

6. The food mixer of claim 5 wherein said user manipulated member is a dial that is moved angularly to cause operation of the potentiometers.

7. A food mixer having:
   a base;
   a rotatable member mounted on the base and adapted to receive and support a bowl to be rotated by the member;
   a first motor drivingly connected to said rotatable member and located within the base and operable to drive the member upon the first motor having a rotational speed;
   a head mounted on the base;
   at least one beater connector supported by said head and configured to receive and rotate a beater to extend into the bowl;
   a second motor drivingly connected to the connector and located within said head to cause rotation of each connector upon the second motor having a rotational speed;
   a user manipulated member that is moved by a user to govern the speed of the first and second motors to ensure there is a correlation between the speed of the first motor and the speed of the second motor; and
   an electric circuit operated by said user manipulated member to deliver electric power to the first motor and the second motor so that the motors have desired speeds between zero and a maximum for each motor.

8. The food mixer of claim 7 wherein said user manipulated member simultaneously operates two components of said circuit to adjust the speed of the motors simultaneously.

9. The food mixer of claim 8 wherein the two components of said electric circuit are a pair of variable resistance potentiometers operated by said user manipulated member, each potentiometer being associated with a respective one of said electric motors to control the speed thereof.

10. The food mixer of claim 9 wherein said user manipulated member is a dial that is moved angularly to cause movement of the potentiometers.

* * * * *